United States Patent [19]
Rink et al.

[11] Patent Number: 5,378,015
[45] Date of Patent: Jan. 3, 1995

[54] INFLATABLE RESTRAINT SYSTEM INFLATOR EMISSION TREATMENT

[75] Inventors: Linda M. Rink, Liberty; William G. Lowe, Ogden; Daniel R. Leininger, Layton, all of Utah

[73] Assignee: Morton International, Inc., Chicago, Ill.

[21] Appl. No.: 66,809

[22] Filed: May 24, 1993

[51] Int. Cl.$^6$ .............................................. B60R 21/26
[52] U.S. Cl. ...................................... 280/736; 280/742
[58] Field of Search ................ 280/736, 740, 741, 742

[56] References Cited

U.S. PATENT DOCUMENTS

| | | | |
|---|---|---|---|
| 4,943,086 | 7/1990 | Cunningham | 280/741 |
| 4,998,750 | 3/1991 | Werner et al. | 280/740 |
| 5,016,914 | 5/1991 | Faigle et al. | 280/741 |
| 5,058,921 | 10/1991 | Cuevas | 280/741 |
| 5,131,680 | 7/1992 | Coultas et al. | 280/737 |

*Primary Examiner*—Kenneth R. Rice
*Attorney, Agent, or Firm*—Nick C. Kottis; Gerald K. White

[57] ABSTRACT

A filter assembly, as well as a treatment system and an inflator module assembly including such a filter assembly are provided. The filter assembly is mounted within the module diffuser housing, external the side or end of an inflator from which gas is emitted and is effective in the treatment of the gaseous emission. Such treatment can include the filtration of particulate from the gaseous emission as well as redirecting the flow of such emission in a desired manner.

19 Claims, 2 Drawing Sheets

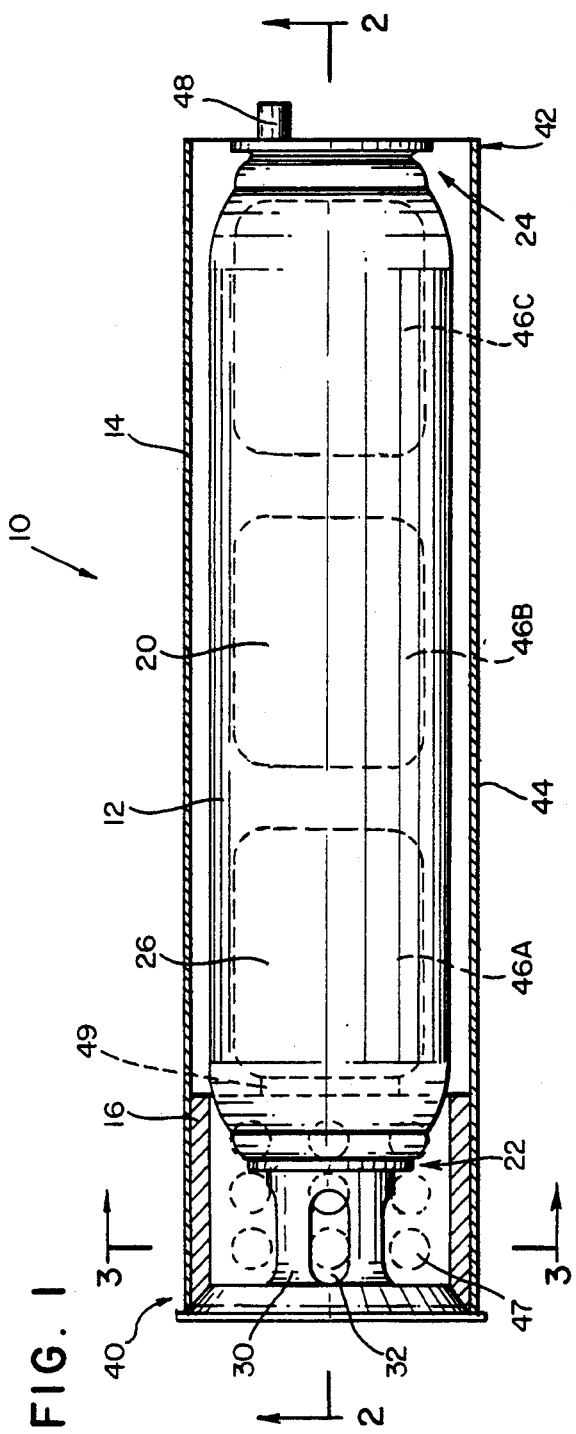
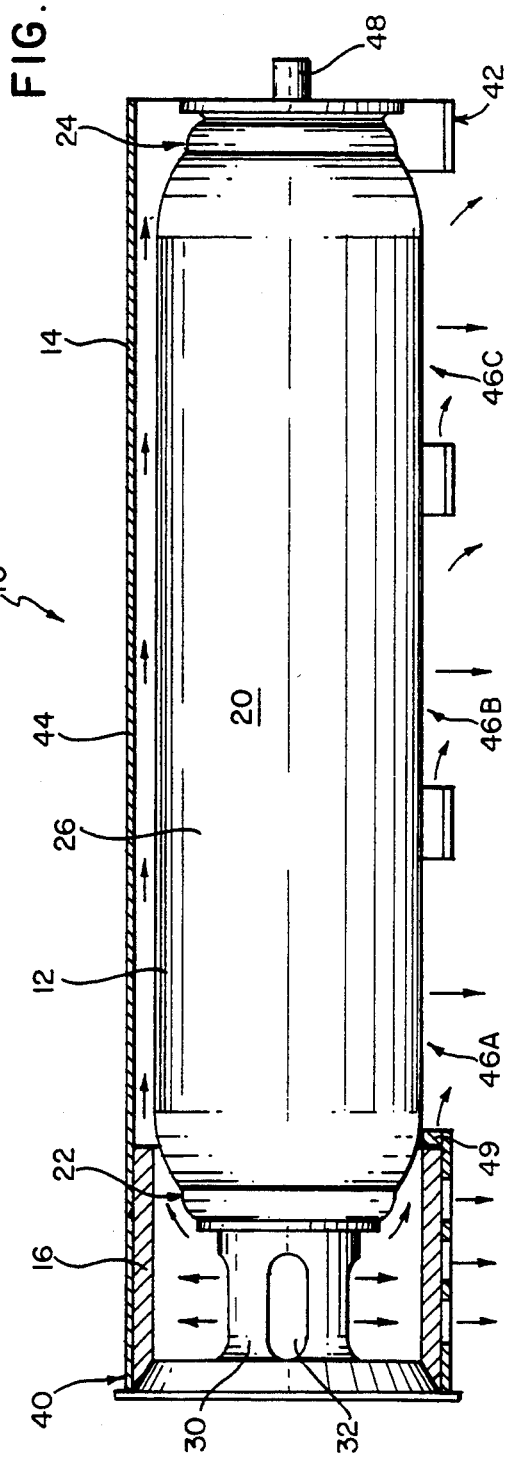

INFLATABLE RESTRAINT SYSTEM INFLATOR EMISSION TREATMENT

BACKGROUND OF THE INVENTION

This invention relates generally to inflatable restraint systems and, more particularly, to improved treatment of the emission of an inflator of such an inflatable restraint system.

Safety restraint systems which self-actuate from an undeployed to a deployed state without the need for intervention by the operator, i e., "passive restraint systems" and particularly those , restraint systems incorporating inflatable bags or cushions, as well as the use of such systems in motor vehicles have been the subjects of much discussion as the desirability of the use of such passive restraint systems has gained general acceptance in the United States.

It is well known to protect a vehicle occupant using a cushion or bag that is inflated with gas, e g , an "air bag" when the vehicle encounters sudden deceleration, such as in a collision. During deployment, the rapidly evolving gas with which the bag is typically filled is an inert gas, e.g., nitrogen. In such systems, the cushion is normally housed in an uninflated and folded condition to minimize space requirements. Upon actuation of the air bag system, gas is discharged from an inflator to rapidly inflate the bag. The cushion, upon inflation, serves to restrain the movement of the vehicle occupant as the collision proceeds. In general, such air bags are commonly designed to be inflated in no more than about 30–60 milliseconds.

Vehicular inflatable restraint systems generally include multiple crash sensors generally positioned about or mounted to the frame and/or body of the subject vehicle and serve to sense sudden decelerations by the vehicle. In turn, the sensor sends a signal to an inflatable air bag/cushion module or assembly strategically positioned within the riding compartment of the vehicle to actuate deployment of the cushion. In general, an inflatable cushion provided for the protection of a vehicle driver, i.e., a driver side air bag, is mounted in a storage compartment located in the steering column of the vehicle. Whereas, an inflatable cushion for the protection of a front seat passenger, i.e., a passenger side air bag, is typically mounted in the instrument panel/dash board of the vehicle.

Typical inflatable cushion restraint systems make use of an air bag module which generally includes an outer reaction housing or canister, commonly referred to as a "reaction can" or, more briefly, as a "can". The reaction canister generally serves to support or contain other components of the air bag module system, including what is referred to as a "air bag inflator" or, more briefly, as an "inflator" or alternatively, as a "generator". The inflator, upon actuation, acts to provide the gas to inflate the air bag/cushion.

Inflators used in such systems are typically either of a pyrotechnic type or one of a variety of types of inflators such as stored gas, combustible gas or, as has become more and more common, a hybrid type inflator which types of inflators generally require gas redirection as such inflators typically discharge gas from one side or end of the inflator structure.

Pyrotechnic inflators generally contain a gas generating material which, upon initiation and activation, generates gas used to inflate the air bag/cushion. In general, the inflation gas produced by a pyrotechnic inflator is emitted from openings or emission ports along the length of the inflator.

In contrast, hybrid type inflators typically in addition to a body of ignitable pyrotechnic material generally contain, as the primary gas used for inflating the air bag, a stored, compressed gas which, upon proper actuation, is expelled from the inflator along with pyrotechnically generated gas. As a consequence of the physics associated with the storage of compressed gases, the inflator in which the compressed gas is stored typically has a cylindrical shape. Furthermore, the discharge of gas from such a cylindrically shaped gas storage container typically occurs by way of openings or emission ports at only one end of the cylindrical container. To attain proper bag deployment, however, it is generally desired that the gas is emitted into the air bag/cushion in a fairly uniform manner. This is especially desirable when the gas is discharged from only one end or side of an inflator device. With typical air bag/inflator assemblies, such uniform emission is generally attained by having a relatively even emission of gas into the deploying bag along the length of the gas inlet opening of the bag connected, directly or indirectly, to the inflator. In this way the bag is properly uniformly deployed and the risk of the bag deploying in a skewed manner due to the discharge of gas from only one end of the storage container is avoided.

U.S. Pat. No. 5,131,680 discloses a type of inflator assembly having a hybrid inflator and a diffuser. The disclosed inflator assembly includes a generally cylindrical container, a generally cylindrical diffuser, and a manifold assembly, secured to one end of the container. The diffuser is larger in diameter than the container and is mounted to encircle both the container and the manifold assembly. Further, the diffuser, which has openings through which the gas is directed to the air bag, extends substantially the entire length of the manifold assembly and a significant portion of the length of the container. Because this diffuser encircles both the container and the manifold assembly and must be able to withstand the stresses applied thereto during operation, such diffusers are generally more bulky and weighty than would be preferred.

In such and similar hybrid inflators, the burning of the pyrotechnic (gas generating) and initiation materials invariably results in the undesired production of particulate material. Various approaches have been attempted and/or suggested to deal with such particulate-containing inflator emissions.

One approach has been to simply inflate the air bag with the particulate-containing inflator emission. As a result, particulate material can be vented out from the air bag and into the vehicle. The particulate material is variously sized and typically includes a large amount of particulate within the respirable range for humans and can cause consequent respiratory problems in humans who have respired the particulate. Also, such particulate can easily become dispersed and airborne so as to appear to be smoke and thereby result in the false impression that there is a fire in or about the vehicle.

It has also been proposed to screen the gaseous emission coming from the pyrotechnic portion of such hybrid inflators. For example, the above-identified U.S. Pat. No. 5,131,680 discloses the inclusion of a circular screen "128" between the body of pyrotechnic material and the orifice through which the pyrotechnically produced emission is passed to the pressurized gas-containing chamber of the hybrid inflator.

Also, U.S. Pat. No. 5,016,914 discloses the inclusion of a filter identified as a metal disk having a plurality of suitably sized openings therein. The disk is disclosed as functioning to trap large particles such as may be present in the generated gas.

Such techniques of filtering or screening the gaseous emission of the pyrotechnic section of the hybrid inflator prior to contact with the stored, pressurized gas of the inflator generally suffer such as from undesirably slowing or preventing the transfer of heat to the stored gas. In general, in such hybrid inflators, the transfer of heat to the stored gas is desired in order to produce desired expansion of the gas. Consequently, the slowing or preventing of desired heat transfer can result in a reduction in the performance of the inflator. Also, the screening or filtering of particulate at this location within the inflator can undesirably effect gas flow within the inflator. For example, the flow of gas out of the pyrotechnic chamber and into the stored gas chamber of the inflator can be undesirably restricted, causing the pressure inside the pyrotechnic chamber to increase and thereby increase the potential for structural failure by such pyrotechnic chamber.

Thus, there is a continuing need for a safe and effective, economical apparatus and technique for particulate removal from the gaseous emission of such inflators. The removal of such particulate material can prevent, minimize or reduce any discomfort to which a vehicle occupant may be subjected to as a result of the use of such inflators in the system. Furthermore, such particulate removal can prevent safety concerns such as a vehicle occupant unnecessarily panicking when he or she, seeing particulate material having become dispersed and airborne within the vehicle, arrives at the false conclusion that the vehicle is on fire.

In addition, the temperature of the gaseous emission of inflators can typically vary between about 1000° F. and 2000° F., dependent upon numerous interrelated factors including the level of inflator performance being sought, as well as the type and amount of gas generant and stored gas used therein, for example. As a result of being subjected to such high temperatures, air bags made of conventional air bag materials, such as nylon or a nylon derivative, can upon deployment experience burning which in turn can increase the potential of the occupant being burned. Consequently, air bags used in conjunction therewith typically must be constructed of or coated with a material resistant to such high temperatures. For example, in order to resist such burning through of an air bag such as made from nylon fabric, the nylon fabric air bag material can be coated with neoprene or one or more neoprene coated nylon patches can be placed at the locations of the air bag at which the hot gas initially impinges. As will be appreciated, such specially fabricated or prepared air bags typically are more costly to manufacture or produce.

Thus, a system permitting the effective treatment of such high temperature gaseous emissions is desired.

SUMMARY OF THE INVENTION

A general object of the invention is to provide a system for the treatment of the gaseous emission of an inflator, providing an improved inflatable restraint system and inflator module assembly.

A more specific objective of the invention is to overcome one or more of the problems described above.

The general object of the invention can be attained, at least in part, through an inflator module assembly including: a module diffuser housing, with an inflator which emits gas from one lateral side or end thereof and a multi-layer filter assembly housed and mounted within the housing external the side or end of the inflator from which gas is emitted. The filter assembly is effective for treating the gaseous emission of the inflator, including: a) filtering therefrom particulate having a diameter in the range of about 0.4 to about 3 microns and greater, and b) redirecting the gaseous emission within the module diffuser housing, in an axial direction.

The prior art fails to adequately filter particulate in this size range from the gaseous emission of such inflators, as used in such systems. Furthermore, the filtering realized with prior art devices and techniques fails to effect desired redirection of gas flow as the filters used therein typically operate in a manner wherein the particulate-containing gas is simply passed through or screened by the filter.

The invention further comprehends a system for the treatment of the gaseous emission of a longitudinally shaped inflator, which emits gas from one lateral side or end thereof, housed within a longitudinally shaped module diffuser in an inflatable restraint system. The treatment system is effective in filtering and redirecting such gaseous emissions and includes a multi-layer filter assembly housed within the module diffuser external the side or end of the inflator from which gas is emitted. The filter assembly is effective to filter particulate having a diameter in the range of about 0.4 to about 3 microns and greater, and to redirect the gaseous emission in an axial direction along the length of the module diffuser.

The invention still further comprehends a multi-layer annular filter assembly for the treatment of the gaseous emission of a longitudinally shaped hybrid inflator which emits gas from one end thereof and is housed within a longitudinally shaped module diffuser. The filter assembly is housed within the module diffuser about the end of the hybrid inflator from which gas is emitted and includes:

a) a first layer of a high temperature resistant support material comprising a metal wire mesh,
b) at least one layer of a metal fine wire screen,
c) at least one layer of a ceramic textile and
d) at least one layer of a ceramic paper. The filter assembly is effective to a) filter, from the gaseous emission, particulate having a diameter in the range of about 0.4 to about 3 microns and greater, and b) redirect the gaseous emission in an axial direction along the length of the module diffuser.

As used herein, the phrase "thrust neutral" refers to the production by an inflator of zero thrust when initiated as, for example, during a deployment event or accidentally during shipping, storage, or handling thereof. That is to say, the gas discharge openings in the inflator are so positioned that the gas is discharged in opposing directions whereby there are no resulting forces tending to cause physical movement of the inflator. Hence, the inflator will expend the energy generated thereby, generally in place.

Other objects and advantages will be apparent to those skilled in the art from the following detailed description taken in conjunction with the appended claims and drawings.

BRIEF DESCRIPTION OF THE DRAWINGS

FIG. 1 is a simplified, partially in section, top plan view of an inflator assembly in accordance with one embodiment of the invention, FIG. 2 is a simplified view, partially in section, of the inflator assembly of FIG. 1 taken substantially along line 2—2 of FIG. 1 and viewed in the direction of the arrows.

For ease of illustration and discussion, like parts in the drawings are designated by the same reference numeral.

DETAILED DESCRIPTION OF THE INVENTION

Figure 3:
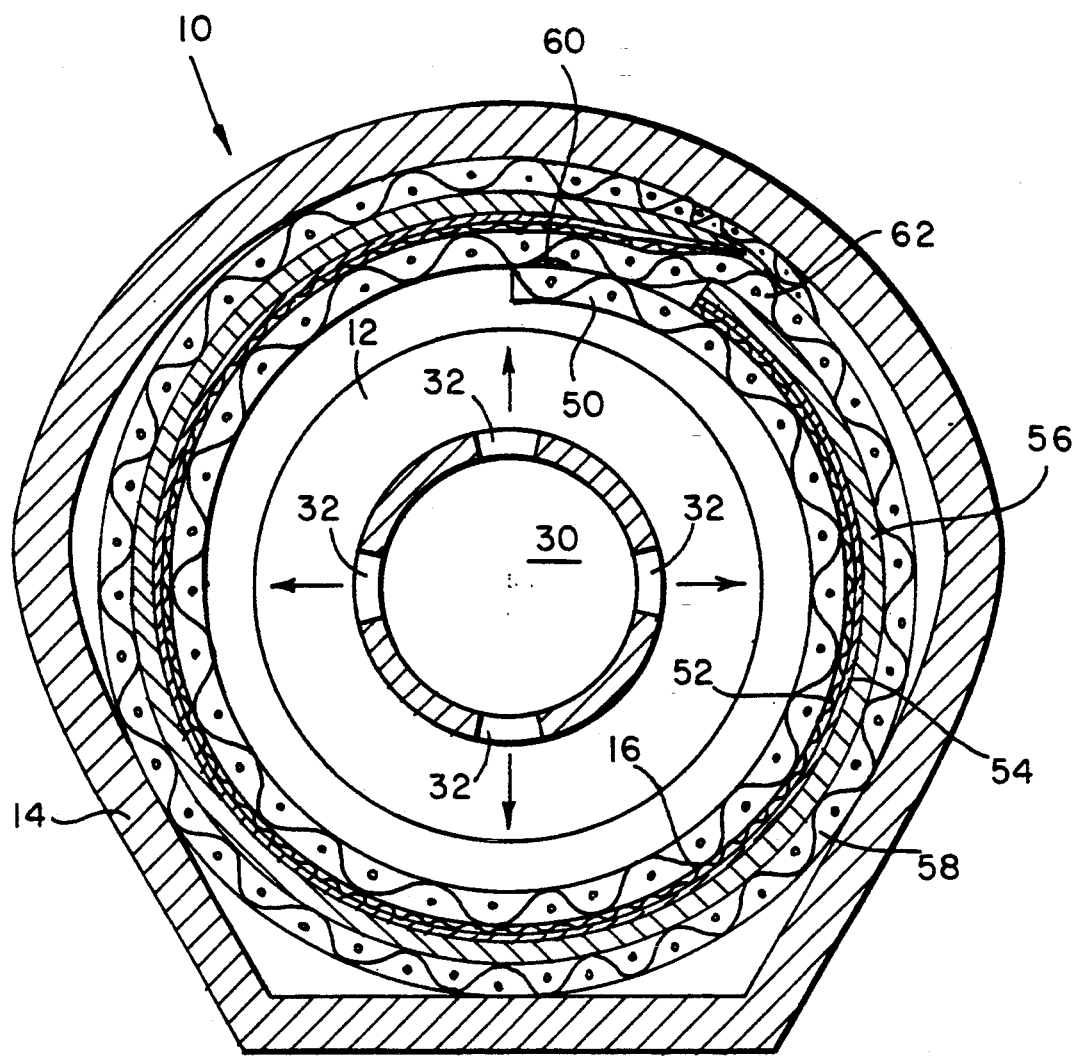
FIG. 3 is a simplified cross sectional view of the inflator assembly of FIG. 1 taken substantially along the line 3—3 of FIG. 1 and viewed in the direction of the arrows. It is noted that in order to permit a clearer viewing of specifically identified and discussed features involved in the practice of the invention, FIG. 3 has not been drawn to scale.

Referring to the drawings, an inflator assembly, generally designated 10, for use in inflating a vehicle inflatable restraint cushion for the passenger side of a vehicle is shown. While the invention will be described below with reference to a passenger side air bag module assembly for automotive vehicles including vans, pick-up trucks, and particularly automobiles, it is to be understood that the invention also has applicability with other types or kinds of air bag module assemblies including passenger side assemblies.

With respect to such automotive vehicles it will be appreciated that due to usual physical differences between passenger and driver side air bag module assemblies, e.g., passenger side air bags generally are comparatively larger than those used in driver side assemblies and thus such passenger side assemblies typically require a comparatively larger volume of inflating gas, the invention has particular utility in passenger side air bag module assemblies.

As shown in FIGS. 1 and 2, the inflator assembly 10 includes a hybrid inflator 12, a module diffuser 14, and a multi-layer gas impingement point filter assembly 16. The inflator 12 is a longitudinally shaped bottle-type inflator, such as described above. The modes of operation of such inflators are well known in the art and thus the inflator 12 will be described herein only in reference to those features or aspects involved in the practice of the subject invention. The inflator 12 includes a gas storage/production section 20 having a first end 22 and a second end 24 with a generally tubular or cylindrical longitudinally elongated body portion 26 extending therebetween. A generally cylindrical inflator gas exit assembly 30 having four spaced gas emission ports, vents or exits, each designated by the reference numeral 32, is shown at first end 22. (Note: One such emission vent 32 is shown in FIG. 1 and a second emission vent 32 is shown in FIG. 2, while FIG. 3 depicts the general location of all four such emission vents in the described embodiment.) In the illustrated inflator 12, the four gas emission vents are generally equally spaced at about 90° about the circumference of the gas exit assembly 30 so as to promote a more uniform distribution of the exiting gas about the circumference of the inflator assembly 10 and to desirably result in the assembly being thrust neutral.

It is to be understood, however, that the invention is not limited to use in conjunction with such a particularly shaped or formed gas exit assembly. For example, the invention can be practiced with gas exit assemblies of various shapes and sizes and having differing number, shape or geometry of gas emission vents, dependent upon factors such as the specific application and desired performance requirements. In general, however, the gas emission vents will preferably be equally or symmetrically spaced, as described above, to promote a more uniform distribution of the gas and to result in the assembly being thrust neutral.

As identified above, the inflator assembly 10 includes a module diffuser 14. The module diffuser 14 houses the inflator 12 and, similar to the inflator 12, is a generally longitudinally shaped structure having a first end 40 and a second end 42 with a generally tubular or cylindrical longitudinally elongated body portion 44 extending therebetween. The dimensions of the module diffuser 14, specifically the diameter and length, are generally such so as to permit the fitting therein of the inflator 12 in at least a generally concentric manner along both the longitudinal and lateral axes, allowing the passage of gas, e.g., gas from the inflator, inside the module diffuser and around the elongated body of the inflator. Thus, the length and diameter can be appropriately altered to satisfy the performance requirements of specific applications. Typically, the module diffuser may be composed of multiple pieces or of single piece construction.

The module diffuser 14 has primary openings 46 and secondary opening 47 through which gas is directed into an air bag (not shown). Such as is known in the art, the air bag has a gas inlet opening joined to the module diffuser permitting the inflation of the air bag.

The primary openings 46 generally extend along the length of the module diffuser longitudinally elongated body portion 44 and serve as the main conveyance point of gas from the module diffuser to the air bag. The secondary openings 47 are situated at the module diffuser end 40, i.e., that end of the module diffuser about the inflator gas exit assembly 30 and which houses the filter assembly 16. The openings 47 permit gas to exit from the module diffuser after the gas has passed through the filter assembly 16. In general, such secondary openings serve to supplement the gas conveyed via the primary openings 46 and thereby serve to more fully maximize conveyance of gas from the inflator and to the air bag about the entire length of the module diffuser. The realization of a fairly uniform distribution of gas conveyance about the length of the assembly, as described above, helps ensure a more uniform deployment of the air bag associated therewith, as is generally desired. As will be appreciated, the invention can, if desired, be practiced without the use of such secondary openings in the module diffuser, generally with at least some minor reduction in the overall performance of the inflator assembly.

The module diffuser openings 46 and 47 can be spaced, shaped, and dimensioned, such as in a manner as is known in the art, to promote a generally more uniform distribution of the gas from the inflator assembly into the air bag and thereby result in the inflation of the air bag in a more ordered, uniform manner. As such module diffuser aspects form no limitation on the practice of the invention, they will not be further described herein.

The inflator 12 is housed or mounted within the module diffuser 14, such as in a manner as is known in the art such as by means of a mounting stud 48, located on inflator end 24. Alternatively, the inflator can be secured within the module diffuser by using one or more fasteners or fastening techniques such as rivets, screws, welds, etc., for example, on either inflator end 22 or 24 or both. It is to be understood, however, that other methods or modes of attaching or mounting of an inflator within a module diffuser are contemplated and the practice of the invention in its broader terms is not limited or restricted to or by any such particular method or mode of attaching or mounting.

The filter assembly 16 is also mounted within the module diffuser housing 14. For example and as shown, the filter assembly 16 is radially restrained by the inner diameter of the module diffuser and axially restrained by means of the end of the module diffuser and an axial stop, such as the baffle 49 situated between the gas exit assembly 30 and the module diffuser primary opening openings 46, just prior to the first primary opening 46A. The baffle 49 extends from the module diffuser 14 towards the inflator 12 and can serve to prevent undesired gas flow channeling through the diffuser, which channeling if uncorrected can result in undesired unsymmetrical bag deployment. While the illustrated embodiment shows the inclusion of only one such baffle it is to be understood that additional baffles such as just prior to the primary openings 46B and 46C can, if desired, also be included. It is also to be understood that in the broader practice of the invention, module diffusers can be used with or without baffles.

In turn, alternative means of axially stopping the filter assembly, such as by welding the assembly to the module diffuser, can, if desired, be used.

The filter assembly 16 is mounted to the interior of the module diffuser 14 along the body portion 44 adjacent the first end 40, opposite the gas emission vents 32 of the inflator gas exit assembly 30. Thus, the filter assembly is positioned, at 2Least roughly, at the point or section of the interior of the module diffuser that the gas exiting the inflator would otherwise contact or impinge upon.

While the location of the filter assembly 16 is generally shown in FIGS. 1 and 2, the structure of the filter assembly 16 is shown in greater detail and with more specificity in FIG. 3. The shape of the filter assembly will generally reflect the shape of the module diffuser. In the illustrated embodiment, the filter assembly is generally annular in construction and, by way of example but not limitation, includes, beginning with the innermost layer most adjacent to the inflator gas exit assembly 30, a wrap 50 of a high temperature resistant support material such as 24×24 stainless steel wire mesh, followed by a layer 52 of a fine wire screen such as 24×110 or 45×170 stainless steel Dutch weave, followed by a layer 54 of a ceramic textile material, followed by a wrap 56 of a ceramic paper material and, preferably, concluding with a layer 58, such as a wrap of a support material such as used for layer 50, to result in the filter assembly 16 being a contained portion for incorporation into the inflator assembly 10.

Such a filter assembly is useful and effective in the treatment of the particulate-containing gaseous emission of inflators such as the described pyrotechnic-containing hybrid inflators. The treatment processing can, for example, include filtration, redirection, and cooling of the particulate-containing inflator emission passing therethrough or impinging thereon.

The filtration treatment of the emission of an inflatable restraint system inflator, as in the invention, is generally in the way of separating particulate, e.g., solid combustion product particles, from the gas passing therethrough. In general, the nature of the particulate will be dependent upon the combustion material, e.g., the pyrotechnic material. For example, typical pyrotechnic-containing hybrid inflators can emit about 3–10 grams of residue, dependent upon generant type and load, and of which typically at least about 50% is of less than 3 microns in diameter.

While the size of the solid particles produced will invariably vary dependent upon numerous interrelated processing and formulation variables including the formulation and method of manufacture of the gas generant, the burn rate of the generant, and the velocity of the emission, which in turn is dependent upon numerous variables including the size and shape of the inflator as well as, for example, the orifice such as that joining the stored gas with the pyrotechnic-containing chamber in some hybrid type inflators, the filter assembly of the invention is preferably effective in the filtration of particulate having a size of at least about 0.4 to about 3 microns in diameter. In reference to filtration, "effective" means that the filter assembly preferably removes at least about 30% and preferably at least about 50% of the particulate present in the mixture being treated thereby. It is also to be understood that the filter assembly typically will also remove at least some particulate of even lesser diameter.

The gas redirection treatment realized by the practice of the invention is typically in the nature of redirecting the flow of the gaseous emission in an axial direction in the module diffuser housing. That is, the gas is redirected along the length of such a longitudinally shaped inflator and similarly shaped module diffuser, for example, so that the emission of gas into the air bag/cushion from such a storage container is done in a fairly uniform manner. In this way the bag can properly be more uniformly deployed and the risk of the bag deploying in a skewed manner due to the discharge of gas from only one end of the inflator device is avoided.

As a result of contact by the gaseous emission with the relatively large amount of surface area provided by the filter assembly which in turn results in increased frictional and conductive heat transfers, the invention results in a reduction in the temperature of the gaseous emission being treated. The cooling of the gas allows the utilization of relatively inexpensive bag materials, such as uncoated nylon, in the system assembly. Also, the risks of the gaseous emission burning through the bag material as well as possibly burning the vehicle occupant is dramatically reduced, if not eliminated.

Further, it is to be understood that the specific structure of and components used in the filter assembly can be appropriately altered to satisfy specific requirements or performance objectives for specific installations. In one preferred embodiment of such a filter assembly, the inner most layer 50 can be constructed of other appropriate materials which desirably provide support to subsequent layers while maintaining operational functioning at the relatively high temperatures at which the filter assembly is typically subjected to in operation. Such a layer also preferably serves to filter the gas passing therethrough, primarily by condensation on the surface thereof.

As will be recognized by those skilled in the art, dependent upon factors such as the specific generant used by the inflator and the inflation gas generated thereby, the temperature tolerance of the material used in the construction of such a layer can vary and thus permit or require the use of a different material of construction for such a support layer, such as the use of metals other than stainless steel as well as screens of varying mesh size and wire diameter. For example, for a filter assembly for use at lower operating temperatures, e.g., for operation at temperatures of about 1200° F. or less, the support layer can be constructed using aluminum. Alternatively, for operation at higher temperatures, e.g., for operation at temperatures between about 1200° F. to 2500° F., the support layer can be constructed using a material such as a corrosion-resistant alloy of nickel and chromium, such as INCONEL (a trademark of Huntington Alloys, Inco Alloys International, Inc).

Similarly, mesh size and wire diameter can be appropriately altered or varied to provide the desired level of performance, including extent of reduction in gas velocity and temperature, for example.

In one preferred embodiment of the invention, the layer 52 is constructed of 24×110 stainless steel wire Dutch weave screen material. Dutch weave is a weave wherein filler wires touch adjacent wires, resulting in a more circuitous route for the emission being filtered therethrough. Thereby, the flow of the filtered material is both slowed and dispersed in an axial direction prior to contact with the finer filtering, more delicate filter medium layer(s).

In the described embodiment, the layer 52 also must be capable of withstanding both high temperatures and high gas velocities and thus this layer also preferably exhibits good structural properties and high temperature tolerance. In addition, in the described embodiment, this layer also can serve to filter larger particulate prior to contact with the subsequent layers of finer filtering media. The early removal of these larger particles avoids the undesired clogging of the following filter layers thereby making the subsequent filter layers more effective, particularly more effective for the separation of finer particulate from the gaseous stream being passed therethrough.

The layer 54, in a preferred embodiment, is made of ceramic textile, preferably of a silica-alumina-boron continuous wound fiber such as NEXTEL, manufactured by 3M. A ceramic is preferred as providing high temperature capability. A textile is preferred as woven materials in general can more easily provide greater structural support than comparative non-woven materials.

In a preferred embodiment, the layer 56 is constructed of a ceramic paper material such as an alumina-silica fiber material such as 1530L ceramic paper, manufactured by Lydall Technical Papers. Such ceramic paper involves the wet laying of non-continuous alumina-silica fiber in a paper-making process. Preferably, this layer provides fine particulate filtering and also has high temperature capabilities.

In a preferred filter assembly design, the gaseous emission being filtered is sufficiently slowed, as a result of the preceding layers of the filter assembly, that the ceramic paper can withstand the gas velocities to which it is subjected to without significantly detrimentally effecting the filtering performance of such a ceramic paper layer. In general, such ceramic paper materials can withstand high temperatures, e.g., temperatures of up to about 2000° F.

As identified above, the filter assembly 16 preferably can be concluded with a layer 58 which serves to assist in holding the filter assembly 16 together as a unit. Such a layer can be the same or different from the material used in the formation of the support layer 50. Further, as will be described below, the final layer 58 can be continuous with the support layer 50.

In the treatment of the gaseous emission of the inflator, such a filter assembly is particularly effective in removing particulate having a mean diameter in the range of at least about 0.4 to about 3 microns.

The filter assembly of the invention can be manufactured or produced by various methods. One preferred method of production is to wrap a layer of the structural support material, e.g., the layer of metal wire mesh, once around a mandrel of a suitable diameter to approximate the filter assembly opening provided for in the inflator assembly. The mesh is then tack welded to itself, such as at 60 (shown in FIG. 3), with a length of the mesh extending therefrom, generally designated by the reference numeral 62. The successive layers of the filter assembly, e.g., layers 52, 54 and 56, are then placed about the support layer with each successive layer placed about the preceding layer. In the above-described preferred filter assembly which includes a final layer 58 of structural support material, such a final layer can be produced by simply wrapping the above-identified extending length of the mesh 62 about the then existing filter assembly.

Such use of a single or continuous layer to in essence "sandwich" intervening layers of filter media can facilitate the production process such as by permitting the use of longer lengths of filter media. In general, such longer lengths of material are more easily handled in production, e.g., such longer lengths are typically more easily handled in such rolling or winding production techniques. In addition, such use can facilitate production by reducing the number of component parts used in the assembly.

Also, it is to be understood that, if desired, various of the filter layers can be joined together prior to assembly of the various layers in the filter. For example, the layer 54 of ceramic textile and the layer 56 of ceramic paper can, if desired, be joined such as to form a laminated material of the ceramic textile and paper for use in the filter assembly. For example, a layer of the ceramic textile and a layer of the ceramic paper can be joined together by using an adhesive, such as an RTV silicone manufactured by Shin-Etsu Chemical Co., Ltd., for example, to laminate these layers together.

While the invention has been described above with reference to use in conjunction with a hybrid inflator, it is to be understood that the invention can be used in conjunction with other types of inflators for which filtering and redirection of the gaseous emission, in the disclosed manner is desired. Such other types of inflators typically involve some combustion reaction and emit gas from a very limited number or concentration of gas emission vents. Such other types of inflators can include, for example, various pyrotechnic inflators.

The invention illustratively disclosed herein suitably may be practiced in the absence of any element, part, step, component, or ingredient which is not specifically disclosed herein.

The foregoing detailed description is given for clearness of understanding only, and no unnecessary limitations are to be understood therefrom, as modifications within the scope of the invention will be obvious to those skilled in the art.

What is claimed is:

1. An inflator module assembly comprising:
   a module diffuser housing;
   an inflator housed within said housing, said inflator, upon actuation, emitting gas from one lateral side or end thereof, and
   a multi-layer filter assembly mounted within said housing external the side or end of the inflator from which gas is emitted, said filter assembly being effective for treating the gaseous emission including: a) filtering therefrom particulate having a size of at least about 0.4 to about 3 microns in diameter and b) redirecting the gaseous emission within said module diffuser housing, in an axial direction.

2. The inflator module assembly of claim 1 wherein said inflator comprises a hybrid inflator which emits gas from one end thereof.

3. The inflator module assembly of claim 1 wherein said inflator emits gas from one end thereof and wherein said multi-layer filter assembly is of annular construction about said end.

4. The inflator module assembly of claim 1 wherein,
   a) said inflator comprises an elongated body portion and emits gas from one end thereof and
   b) said module diffuser housing comprises an elongated body portion having primary gas conveyance openings along the length thereof and additionally comprises secondary gas conveyance openings at the end of said module diffuser housing about the gas emission end of said inflator.

5. The inflator module assembly of claim 1 wherein said multi-layer filter assembly comprises:
   a) at least one layer of a high temperature resistant support material,
   b) at least one layer of a ceramic textile, and
   c) at least one layer of a ceramic paper.

6. The inflator module assembly of claim 5 wherein said ceramic textile comprises a silica-alumina-boron fiber.

7. The inflator module assembly of claim 5 wherein said ceramic paper comprises an alumina-silica fiber material.

8. The inflator module assembly of claim 1 wherein said multi-layer filter assembly comprises:
   a) a first layer of a high temperature resistant support material comprising a metal wire mesh,
   b) at least one layer of a fine wire metal screen,
   c) at least one layer of a ceramic textile,
   d) at least one layer of a ceramic paper, and
   e) a concluding layer of said high temperature resistant support material, continuous with said first layer.

9. In an inflatable restraint system having a longitudinally shaped inflator housed within a longitudinally shaped module diffuser and which inflator emits gas from one lateral side or end thereof, a system for the treatment, including filtration and redirection, of the gaseous emission of the inflator comprising:
   a multi-layer filter assembly housed within the module diffuser external the side or end of the inflator from which gas is emitted, said filter assembly being effective to filter particulate having a size of at least about 0.4 to about 3 microns in diameter from the gaseous emission and to redirect the gaseous emission in an axial direction along the length of the module diffuser.

10. The system of claim 9 wherein said inflator comprises a hybrid inflator which emits gas from one end thereof and wherein said multi-layer filter assembly is of annular construction about said end.

11. The system of claim 9 wherein,
    a) said inflator comprises an elongated body portion and emits gas from one end thereof and
    b) said module diffuser housing comprises an elongated body portion having primary gas conveyance openings along the length thereof and additionally comprises secondary gas conveyance openings at the end of said module diffuser housing about the gas emission end of said inflator.

12. The system of claim 9 wherein said multi-layer filter assembly comprises:
    a) at least one layer of a high temperature resistant support material most adjacent the end of the inflator emitting gas,
    b) at least one layer of a ceramic textile, and
    c) at least one layer of a ceramic paper.

13. The system of claim 12 wherein said high temperature resistant support material comprises a metal wire mesh.

14. The system of claim 12 additionally comprising a layer of metal fine wire screen in-between said metal wire mesh support layer and said at least one layer of ceramic textile.

15. In an inflatable restraint system having a longitudinally shaped hybrid inflator which emits gas from one end thereof and housed within a longitudinally shaped module diffuser, a multi-layer annular filter assembly for the treatment of the gaseous emission of the inflator, said assembly comprising:
    a) a first layer of a high temperature resistant support material comprising a metal wire mesh,
    b) at least one layer of a metal fine wire screen,
    c) at least one layer of a ceramic textile and
    d) at least one layer of a ceramic paper, said filter assembly being housed within the module diffuser external the end of the inflator from which gas is emitted and being effective to a) filter particulate having a size of at least about 0.4 to about 3 microns in diameter from the gaseous emission and b) to redirect the gaseous emission in an axial direction along the length of the module diffuser.

16. The assembly of claim 15 for use at operating temperatures of no more than about 1200° F. wherein said metal of said wire mesh is aluminum.

17. The assembly of claim 15 for use at operating temperatures between about 1200° F. to 2500° F. wherein said metal of said wire mesh is an alloy of nickel and chromium.

18. The assembly of claim 15 additionally comprising a concluding layer of said high temperature resistant support metal wire mesh material, continuous with said first layer.

19. The assembly of claim 15 wherein said ceramic textile comprises a silica-alumina-boron fiber and said ceramic paper comprises an alumina-silica fiber material.

* * * * *